United States Patent

Bednarz et al.

[11] 4,376,350
[45] Mar. 15, 1983

[54] AUTOMATIC DOWN RIGGER CONTROL SYSTEM

[75] Inventors: John J. Bednarz, Elmhurst; Phillip J. Moser, Bensenville; Roger L. Rosenberg, Arlington Heights, all of Ill.

[73] Assignee: Circom, Inc., Bensenville, Ill.

[21] Appl. No.: 226,930

[22] Filed: Jan. 21, 1981

[51] Int. Cl.³ .............................................. A01K 89/017
[52] U.S. Cl. ...................................... 43/26.1; 43/27.4; 242/106
[58] Field of Search .................. 43/4, 6.5, 21, 26.1, 43/27.4; 242/106, 84.1 A

[56] References Cited

U.S. PATENT DOCUMENTS

| 2,735,207 | 2/1956 | Christiansen | 43/15 |
| 3,916,555 | 11/1975 | Booth et al. | 242/106 X |
| 3,922,808 | 12/1975 | Rieth et al. | 43/4 |
| 4,191,340 | 3/1980 | Kubanek | 43/4 X |
| 4,253,165 | 2/1981 | Christiansen | 43/26.1 X |

*Primary Examiner*—Nicholas P. Godici
*Assistant Examiner*—Charles L. Willis
*Attorney, Agent, or Firm*—Hill, Van Santen, Steadman, Chiara & Simpson

[57] ABSTRACT

An automatic down rigger control system is disclosed for use with a down rigger trolling line operated by a motor for raising and lowering the trolling line. Via the motor, the control system automatically lowers an end of the trolling line to a predetermined depth point and automatically raises the end of the trolling line to a predetermined surface point. Also, a manual operation mode is provided for selectively raising and lowering the trolling line to a depth other than the surface point and predetermined depth point.

15 Claims, 5 Drawing Figures

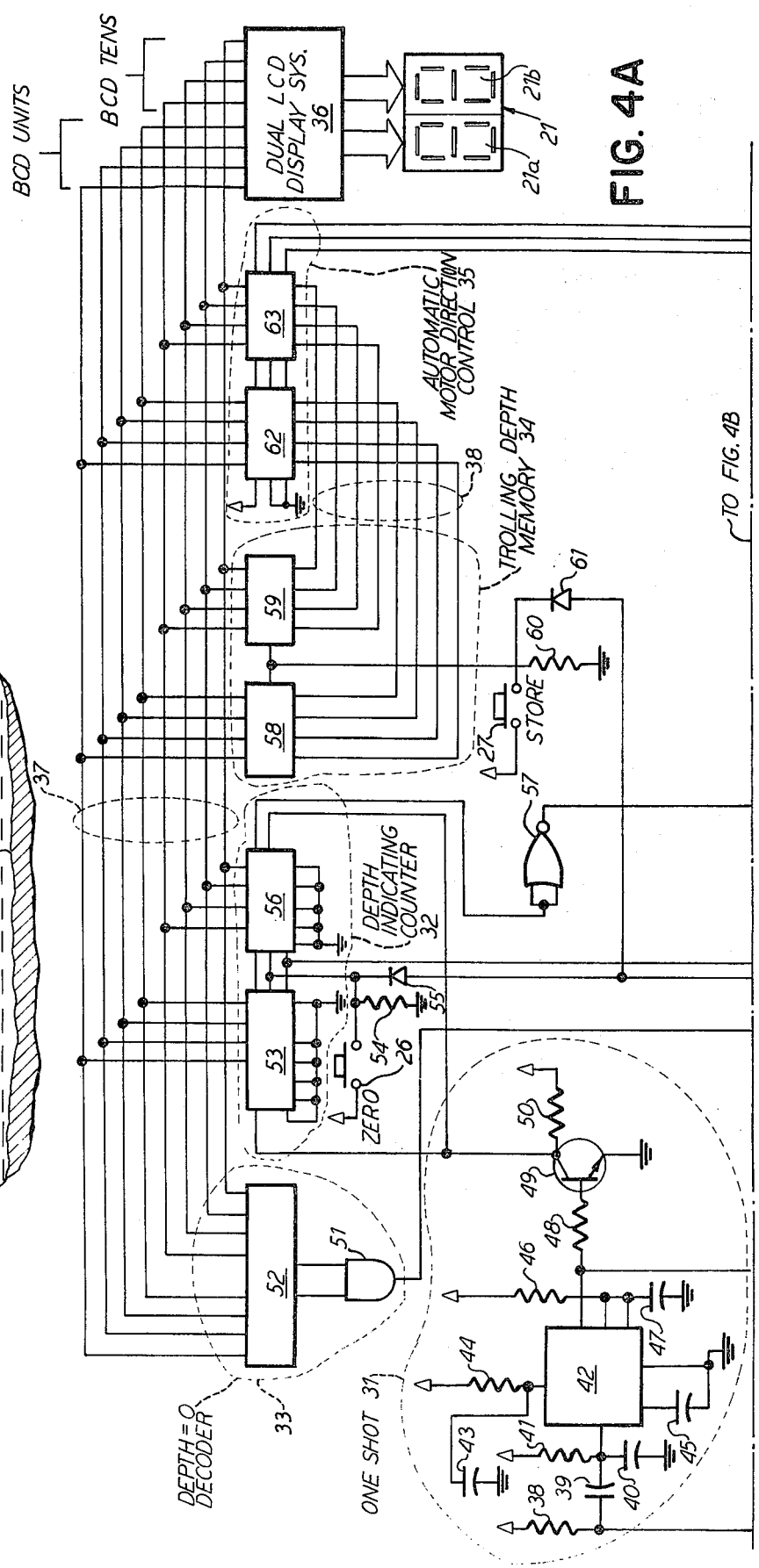

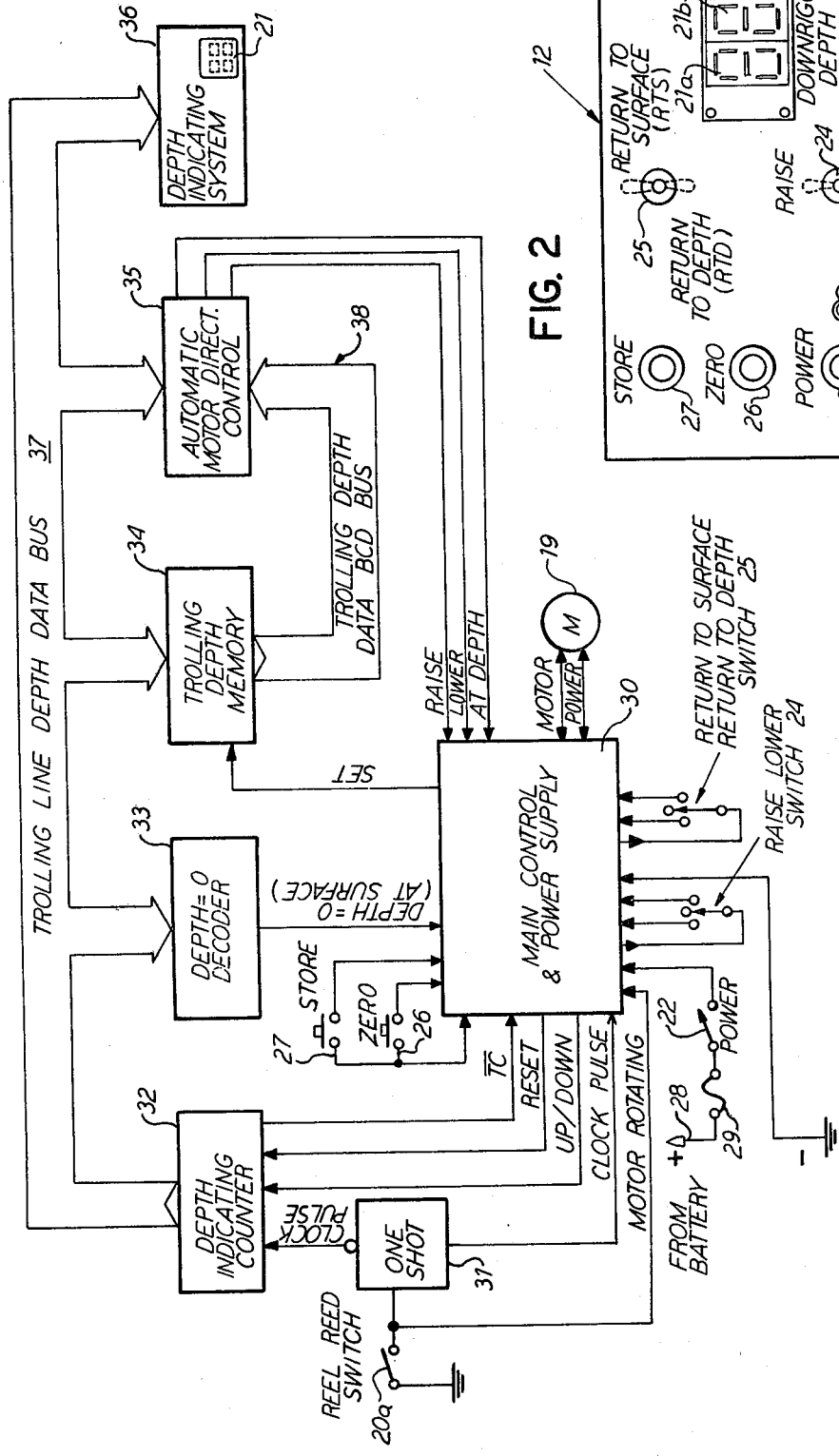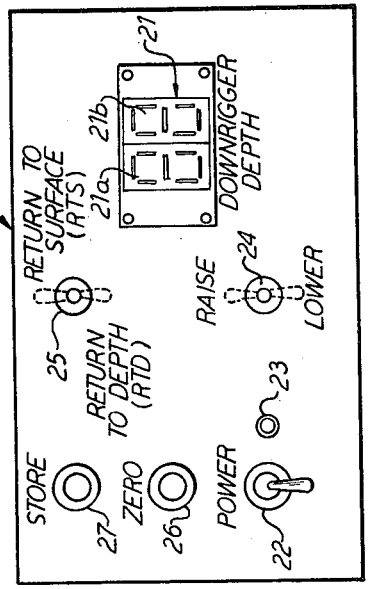

AUTOMATIC DOWN RIGGER CONTROL SYSTEM

RELATED APPLICATIONS

This application is related to co-pending application No. 208,495, now U.S. Pat. No. 4,339,811.

BACKGROUND OF THE INVENTION

It has been known for fishing near the bottom of a lake to employ a down rigger system wherein a relatively strong trolling line is played out from a rear of the boat. The line has a heavy weight attached thereto so that it descends substantially vertically with respect to the bottom during trolling motion. A fishing line is releasably attached to the weight so that when a fish strikes, the fishing line is released from the weight and the fisherman can play the fish without interference from the down rigger weight.

It is known according to U.S. Pat. No. 3,910,524 to provide a reversible motor connected to a down rigger reel to extend and retract the line. However, with such a prior art system, line extension must be constantly monitored so that when the weight hits bottom or is at the desired depth, the motor can be disengaged. Also, with such prior art systems, each time the line is lowered, such supervision must be maintained.

SUMMARY OF THE INVENTION

It is an object of the invention to provide an automatic trolling system which will automatically lower an end of the trolling line to a predetermined depth without the need for continuous operator supervision.

It is a further object of the invention to store a predetermined depth in a control system for the automatic trolling operation so that once a trolling depth is determined, the end of the trolling line can be returned to the same depth in repeated fashion.

It is another object of the invention to provide an automatic trolling system wherein the end of the line can be raised to a predetermined point in a region of a surface of the water without the need for continuous operator supervision.

It is a further object of the invention to provide both automatic and manual modes of operation which can interact with one another so that the operator of the system can selectively utilize automatic operation for lowering an end of the trolling line to a predetermined depth and raising the trolling line end to a predetermined surface point, while retaining the ability to manually lower the trolling line via the motor to a desired depth other than the predetermined depth and surface point.

According to the invention, an automatic down rigger control system is provided for use with a motor driven down rigger trolling line which automatically lowers an end of the trolling line by motor control to a predetermined depth. The control system includes memory means for storing the predetermined depth. Also, the system may have the capability of automatically returning the end of the trolling line to a surface point in a region of the surface of the water. Additionally, manual control means may be provided to interact with the automatic system to allow the operator to selectively position an end of the trolling line at a depth other than the predetermined depth point and surface point. Other objects and features of the invention will be set forth in the more detailed description of the preferred embodiments of the invention set forth hereafter.

BRIEF DESCRIPTION OF THE DRAWINGS

FIG. 1 is a side view of a fishing boat utilizing the automatic down rigger control system of the invention;

FIG. 2 is a front view of a control box of the automatic down rigger control system of the invention;

FIG. 3 is a block diagram for the control system of the invention; and

DESCRIPTION OF THE PREFERRED EMBODIMENTS

Figure 4B:
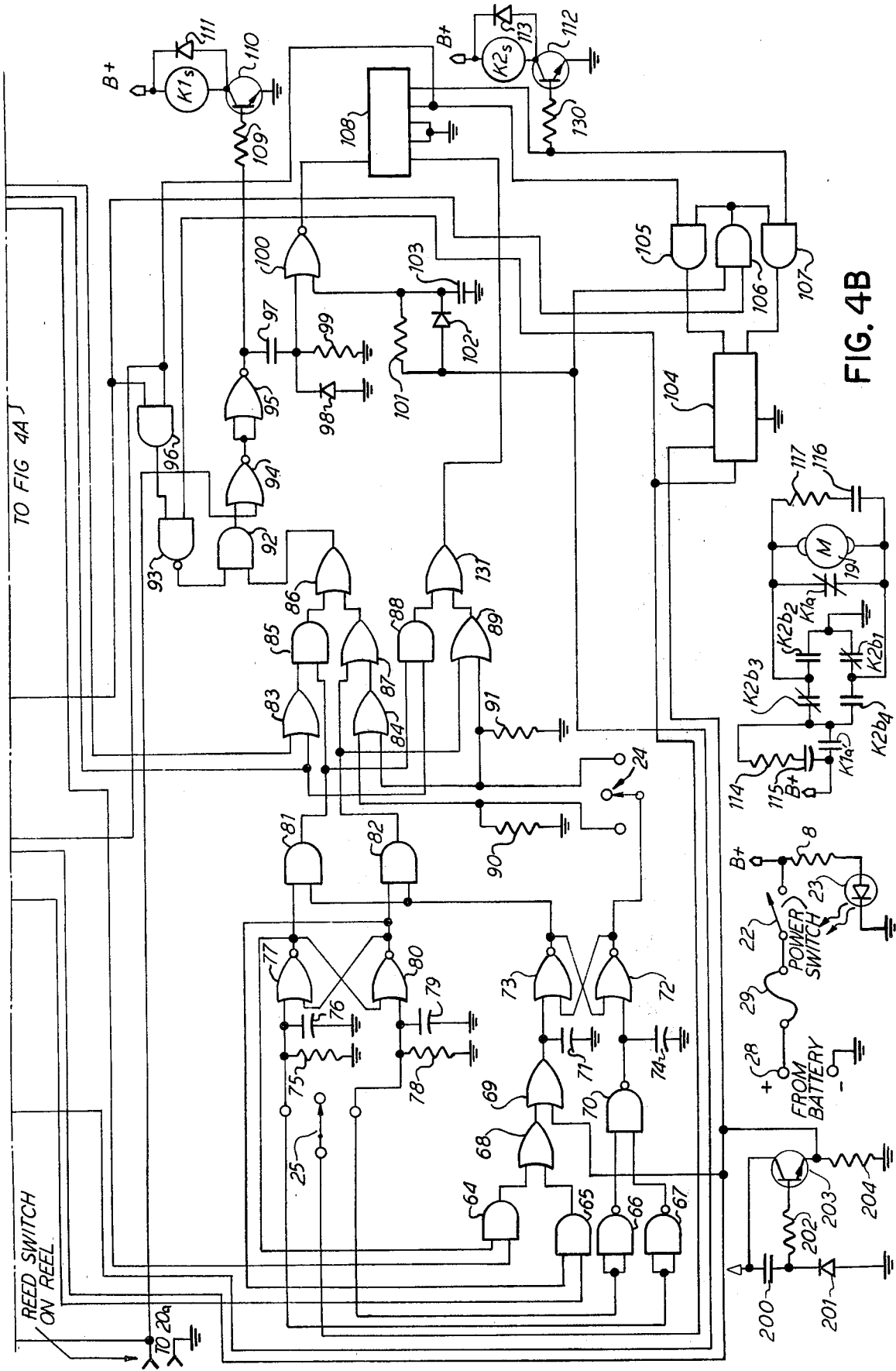
FIG. 4 is a circuit diagram corresponding to the block diagram of FIG. 3.

As shown in FIG. 1, a trolling fishing boat 11 is provided with a down rigger system 13 comprised of a reel 14, pole 15, trolling line 16, weight 17 and fishing line 18 releasably attached to the weight 17. An automatic down rigger control system 12 of the invention electrically controls a motor 19 which drives the reel 14. In order to sense line 16 extension or retraction, each revolution of the reel 14 is detected by providing a magnet 20b thereon and a sensing switch 20a such as a reed switch in proximity to the magnet 20b such that the magnet 20b will activate the switch 20a for each rotation of the reel 14. Since the diameter change during line 16 retraction or extension on the reel 14 is not great, the estimation of line 16 length according to this system is sufficiently accurate for most purposes when setting the weight 17 at a predetermined distance below the surface 9 of the lake, ocean, or river.

As shown in FIG. 2, the control unit 12 has a digital display 21 with a tens digit 21a and a units digit 21b. A power switch 22 is provided together with a power indicating light 23. Preferably the unit operates with a 12 volt battery power source. Also on the front panel of unit 12 a raise-lower switch 24 is provided as a three position toggle switch with a neutral position and upper and lower momentary contact positions. The return to surface (RTS)/return to depth (RTD) switch 25 is of similar design. Momentary contact push buttons 26 and 27 are respectively provided for "zero" setting of the unit to establish a surface point to which the trolling line is raised and a "store" actuation for storing a desired predetermined depth for lowering the down rigger trolling line. Functional descriptions for the controls are explained below after the block diagram and circuit descriptions.

A block diagram of the control unit 12 is illustrated in FIG. 3. From a power source, the system connects at terminal 28 through a fuse 29 to the power switch 22. A main control and power supply 30 is provided receiving power from the power switch 22 and also being controlled by the raise/lower switch 24 and return to surface/return to depth switch 25. The control and supply 30 also controls the motor 19, depth indicating counter 32 and trolling depth memory 34. The store switch 27 and zero switch 26 also connect with the control and supply 30.

The reed switch 20a sensing rotations of the trolling line reel 14 connects with the one shot circuit 31 which feeds its output to the depth indicating counter 32. From there, the trolling line depth data bus 37 feeds the depth equals zero decoder 33, trolling depth memory 34, automatic motor direction control 35, and depth indicating system 36 having the digital display 21. A trolling depth data bus 38 is connected between the trolling depth memory 34 and automatic motor direction control 35.

FIGS. 4a,b illustrate the circuit diagram corresponding to the block diagram illustrated in FIG. 3. As shown there, power from terminal 28 and coupled through power switch 22 activates indicator light 23 through resistor 8. Power is then fed to the various integrated circuits and logic gates, such as through a regulating circuit not shown in greater detail.

From the reed switch 20a, a signal is fed to the one shot circuit 31 preferably designed with a Signetics integrated circuit NE555 having at its input the coupling capacitor 39 together with resistors 38, 41 and capacitor 40 to ground. Outboard capacitor 45 is also provided together with outboard resistor 44 and capacitor 43. Resistor 46 series connected with capacitor 47 to ground has the junction connected to the integrated circuit 42. The output connects through resistor 48 to inverting transistor 49 having a pull up resistor 50. The output from this transistor connects to the depth indicating counter 32 which is comprised of two integrated circuits 53 and 56 preferably Fairchild type 4510. At one input a control line from a diode 55 and also zero switch 26 with resistor 54 is connected. The two integrated circuits 53 and 56 have outputs feeding the trolling line depth data bus 37. This same data bus feeds the depth equals zero decoder 33 provided as a Fairchild integrated circuit type 4002 at 52. its output connects through an AND gate 51 to the main control system 30.

The data bus 37 also feeds the trolling depth memory 34 having two integrated circuits 58 and 59 preferably Fairchild integrated circuits 40175. Inputs of these circuits connected to the data bus 37 and outputs provide the trolling depth data BCD bus 38 to the automatic motor direction control 35 which also receives signals from the data bus 37. The automatic motor direction control 35 includes integrated circuits 62 and 63 as Fairchild 40085 types. Outputs from the control 35 connect to the various indicated portions of the main control 30. A store switch 27 together with a diode 61 and resistor 60 to ground, connect at a control line for each of the integrated circuits 58 and 59 in the trolling depth memory 34.

A dual LCD display system 36 has its units and tens inputs connected to the data bus 37 and drives a digital display 21 in well known fashion. The depth indicating system 36 is well known in the art and utilizes Fairchild integrated circuit type 4543 as a decoder for illustrating tens and units data on the display 21.

The circuitry for the main control 30 includes a variety of logic gates operable in conjunction with the return to surface/return to depth switch 25 and raise/lower switch 24 so as to selectively control the motor 19 via the relays K1 and K2.

The relay circuit shown at the lower right hand corner of FIG. 4 includes a capacitor 116 and resistor 117 connected across the motor 19. Switch contacts K1a lie across the motor and contacts K2b are connected to the motor and ground via contacts K2b1 and K2b2. The motor terminals also connect to B+ through contacts K2b3 and K2b4 through resistor 114 and capacitor 115. Contact K1a' connects to B+ and also to contacts K2b4 and K2b3.

Corresponding relay coils K1s and K2s having diodes 111 and 113 thereacross are actuated by transistors 110 and 112 via feed resistors 109 and 130 respectively.

The transistor circuit in the lower left corner of FIG. 4B consists of transistor 203 with resistor 204 from its emitter to ground, capacitor 200 from the collector to resistor 202, and diode 201 from resistor 202 to ground.

The main control 30 include logic gates 64, 65, 66, 67, 68, 69, 70, 73, 72, 77, 80, 81, 82, 83, 84, 85, 87, 88, 89, 86, 131, 92, 93, 94, 95, 96, 100, 105, 106 and 107 connected as shown in the drawing. In addition, integrated circuits at 108 and 104 are provided as Fairchild type 4013. In view of the detailed circuit diagram provided, further description of the main control circuit connections is not required in order to permit one skilled in this art to construct the preferred form of the invention.

The automatic down rigger control system of the invention operates in the following manner. The power switch 22 supplies power from a suitable power source to the control circuit 30 and the relay control circuitry for the down rigger motor. For any functions to operate, the power switch must be on.

The raise-lower switch 24 when operated in the raise direction will cause the down rigger to take up line. Since the switch is a momentary operation type, it is necessary to hold the switch in position for the duration of time required to move the weight to the desired location. Operating the switch in the lower direction will cause the down rigger to extend line. The circuit will only allow the down rigger to extend or retract line in one foot increments. Therefore, the down rigger will stop at the next one foot increment after releasing the switch.

The zero push button switch 26 when momentarily depressed causes the down rigger depth display 21 to read zero. This is utilized to reference the down rigger weight to a surface point at or near a surface of the water. Such point may be slightly below the surface of the water or slightly above the surface of the water. The surface point is chosen by the operator so that the weight 17 is as close to the surface 9 as possible. If it is desired to raise the weight above the surface to facilitate baiting the line, the operator may use the raise/lower switch 24 to do so. When the weight is above the surface point, both auto functions are disabled. When the weight is lowered to or below the surface point the auto functions become enabled again.

After using the raise-lower switch 24 to lower the down rigger weight to a desired trolling depth, the store push button 27 is momentarily depressed to store the depth in the system memory.

The return to surface (RTS)—return to depth (RTD) switch 25 when momentarily operated in the RTS direction will initiate an automatic return to surface operation. The down rigger weight will automatically be raised to the surface at which time the motor will stop. Operating this switch in the RTD direction will initiate an automatic return to depth operation. The down rigger weight will automatically move in the direction necessary to return the weight to the trolling depth stored in the system memory and then stop at that depth.

When either automatic function is initiated, the raise-lower switch functions are disabled for the duration of the automatic function cycle. If after initiating an automatic function (for example return to surface), it is desired to change to the opposite function (return to depth), momentarily operating the switch in the desired direction will reverse the automatic mode. It is not possible to disengage the automatic mode until a RTS or RTD cycle has been completed. If an emergency necessitates disengaging the autofunctions before a cycle is complete, the power switch is turned off. After waiting ten seconds, the power switch is turned on and then the initial set up instructions described above are performed to restore the system to normal operating parameters.

If the down rigger weight is lowered to ninety-nine feet, the lower function will be disabled, making it impossible to over range the depth display. The raise, RTS, and RTD functions will not be affected. If the weight is raised above the surface point, the display will change from zero to ninety-nine and continue to count down from ninety-nine as the weight is raised further above the surface. When the weight is above the surface, the RTS and RTD functions will be disabled to prevent undesirable and improper operation of the auto-mode. When the weight is lowered to or below the surface, the RTS and RTD functions become enabled again. The raise and lower functions are not affected by this under-ranging condition. This makes it possible to raise the weight out of the water for reattaching the fishing rig.

Although various minor modifications may be suggested by those skilled in the art, it should be understood that we wish to embody within the scope of the patent warranted hereon, all such embodiments as reasonably and properly come within the scope of our contribution to the art.

We claim as our invention:

1. An automatic down rigger control system for use with a down rigger trolling line operated by a motor means for raising and lowering the trolling line, comprising:

control system means for automatically controlling the motor means for lowering an end of the trolling line to a predetermined depth point and automatically raising the end of the trolling line to a predetermined surface point in a region of the surface of the water, said control system means including memory means for storing said predetermined depth point and predetermined surface point;

said memory means comprising an electronic memory which receives as an input said predetermined surface point in response to actuation of a zero switch means and receives as an input said predetermined depth point in response to actuation of a store switch means; and motor direction trolling control means for comparing depth as established by a counter with said stored predetermined depth point or predetermined surface point.

2. The system according to claim 1 wherein said control system means further includes means for manually controlling the motor means to lower the end of the line to a desired depth point and raising the end of the line to a desired surface point in a region of the surface.

3. The system according to claim 2 wherein means are provided for selectively storing said desired depth point as said predetermined depth point and storing said desired surface point as said predetermined surface point.

4. The system of claim 1 wherein said predetermined surface point is in a range from a point above the surface of the water to a point below the surface of the water.

5. The system of claim 1 wherein said control system means has digital display means for continuously displaying line depth.

6. The system of claim 5 wherein the display means displays depth in one foot increments and the control system means ceases raising and lowering operations in one foot increments.

7. The system of claim 5 wherein said display means indicates a depth of 0 for said predetermined surface point.

8. The system of claim 7 wherein the control system means has means for preventing lowering the line beyond a maximum predetermined depth point relative to said surface point.

9. The system of claim 8 wherein immediately above said predetermined surface point said display means indicates said maximum depth point and counts downwardly as the end of the line is raised further.

10. The system of claim 1 wherein momentary contact first operator actuated switch means are provided for initiating automatic raising or lowering to said predetermined surface or depth points, respectively without further operator intervention.

11. The system of claim 10 wherein second operator actuated switch means are provided for initiating manual raising or lowering the trolling line to said desired surface point or depth point, respectively.

12. The system of claim 11 wherein means are provided for deactivating said second switch means when the automatic operation initiated by said first switch means is in progress.

13. The system of claim 1 wherein a switch means is provided at a reel of the trolling line for signaling revolutions of the reel as an indication of line length being fed in or out, and a depth indicating counter means is provided for counting the revolutions indicated by the switch means.

14. The system of claim 1 wherein said switch means comprises a magnet and associated magnet operable switch.

15. An automatic down rigger control system for use with a down rigger trolling line operated by a motor means for raising and lowering the trolling line, comprising:

control system means for automatically controlling the motor means for lowering an end of the trolling line to a predetermined depth point and automatically raising the end of the trolling line to a predetermined surface point in a region of the surface of the water, said control system means including memory means for storing said predetermined depth point and predetermined surface point; and said memory means comprising an electronic memory which receives as an input said predetermined surface point in response to actuation of a zero switch means and receives as an input said predetermined depth point in response to actuation of a store switch means.

* * * * *